United States Patent [19]

Glennon

[11] Patent Number: 4,527,226
[45] Date of Patent: Jul. 2, 1985

[54] INVERTER CONTROL SYSTEM FOR PROVIDING AN EASILY FILTERED OUTPUT

[75] Inventor: Timothy F. Glennon, Rockford, Ill.

[73] Assignee: Sundstrand Corporation, Rockford, Ill.

[21] Appl. No.: 547,785

[22] Filed: Nov. 2, 1983

[51] Int. Cl.³ .............................................. H02M 1/12
[52] U.S. Cl. ........................................ 363/41; 363/79; 363/95
[58] Field of Search ........................ 363/40, 41, 57, 58, 363/79, 95, 96, 135, 136, 137, 138, 139

[56] References Cited

U.S. PATENT DOCUMENTS

| | | |
|---|---|---|
| 3,436,643 | 4/1969 | Castiglione .......................... 363/41 |
| 3,764,884 | 2/1973 | Reeve . |
| 4,099,109 | 11/1978 | Abbondanti . |
| 4,245,290 | 3/1981 | Lipman . |
| 4,290,108 | 5/1981 | Woehrle et al. . |
| 4,312,031 | 1/1982 | Kudor . |

FOREIGN PATENT DOCUMENTS 0063176 10/1982 European Pat. Off. .............. 363/41

Primary Examiner—Peter S. Wong
Assistant Examiner—Anita M. Ault
Attorney, Agent, or Firm—Wood, Dalton, Phillips, Mason & Rowe

[57] ABSTRACT

An inverter control system for selecting an angle set defining an inverter output waveform in response to various operating conditions of the inverter. The inverter control system selects an angle set in response to signals representing the power factor of the load and the normalized DC bus voltage to minimize the harmonic content of the inverter output waveform and to compensate for voltage drops occurring between the DC power supply and the load. The inverter control system is also responsive to the inverter filter output current to detect fault conditions and in response thereto, to select at least one angle set defining a waveform to reduce the voltage at the load to zero while allowing the filter output current to increase to a given percentage of the rated current.

16 Claims, 8 Drawing Figures

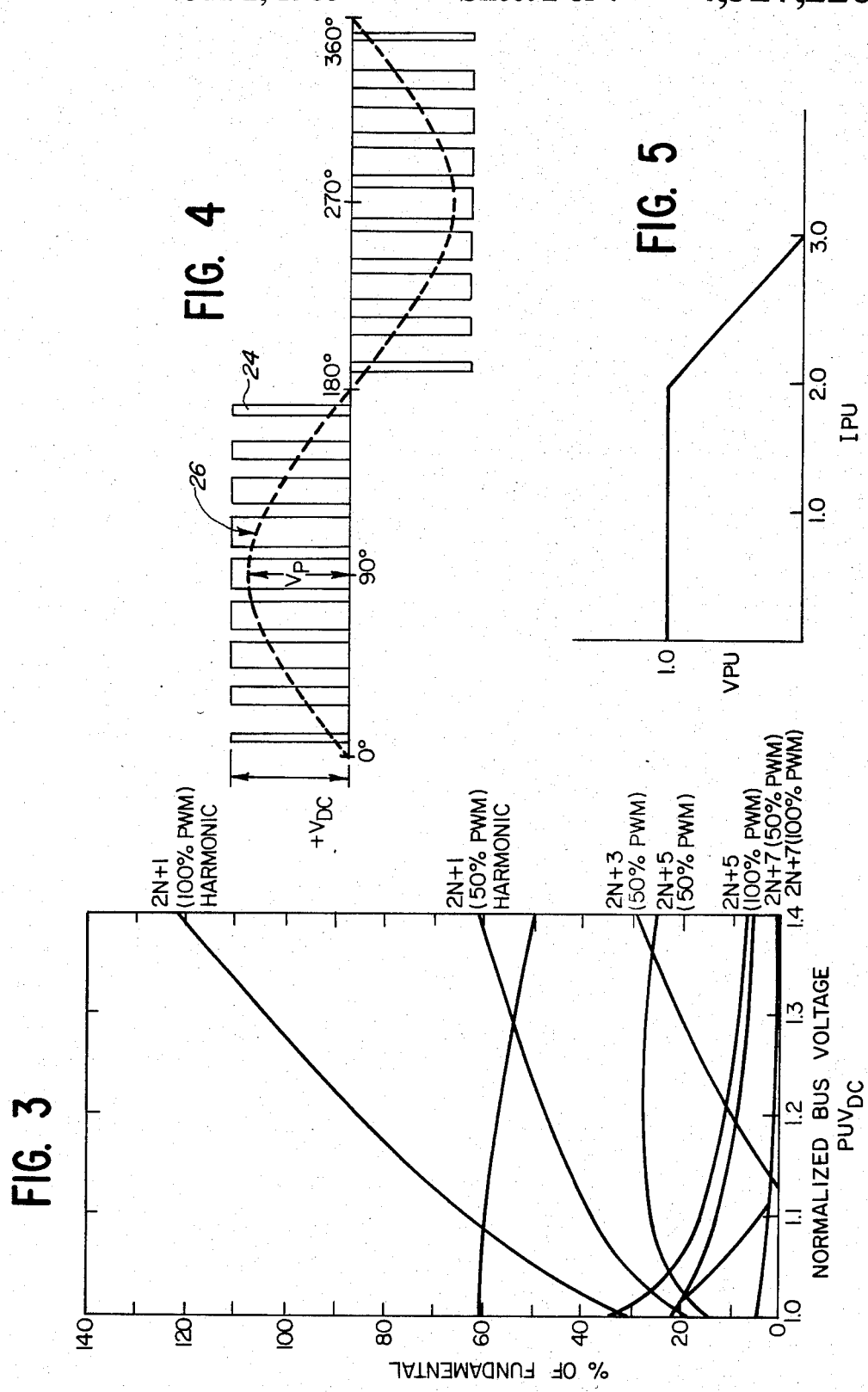

9 PULSES

INVERTER CONTROL SYSTEM FOR PROVIDING AN EASILY FILTERED OUTPUT

TECHNICAL FIELD

The present invention relates to a control system for operating an inverter to provide a desired waveform and more particularly to an inverter control system for selecting an angle set defining an inverter output waveform having easily filtered harmonics.

BACKGROUND OF THE INVENTION

Pulse width modulated (PWM) inverters having a DC power supply may be employed on aircraft and the like to provide a waveform to a filter having an AC output which supplies power to the aircraft's loads. Known inverters typically include a pair of switches connected between the positive and negative terminals of the DC power supply and the load. The inverter switches, which may be transistors or the like, are controlled to alternately conduct current to the output filter, the switches providing a pulse width modulated waveform to the filter which in response thereto provides an AC output which is applied to the load.

Known PWM inverters typically include a control system which operates the inverter switches to provide a single pattern pulse width modulated waveform to the filter. However, with any single pattern of pulse width modulated waveforms, distortion associated with power factor loads, i.e. reactive load, may be produced in the output. Inverters employing known control systems to provide a single pattern pulse width modulated waveform typically do not take into account power factor loads which may introduce undesirable harmonics which are not easily filtered in the output of the inverter. In order to eliminate these harmonics from the inverter output waveform, the attenuation requirement of the output filter must typically be very large resulting in a heavy filter which is undesirable for many applications. Further, inverters employing such control systems typically do not compensate for voltage drops occurring between the DC power supply of the inverter and the point of regulation at which the AC output is applied to the load so that the peak amplitude of the AC output is not constant.

Examples of various known inverter control systems are found in the following patents: Abbondanti U.S. Pat. No. 4,099,109, Lipman U.S. Pat. No. 4,245,290, and Woerhle et al. U.S. Pat. No. 4,290,108.

DISCLOSURE OF THE INVENTION

In accordance with the present invention, the disadvantages of prior control systems for PWM inverters as discussed above have been overcome.

The inverter control system of the present invention provides selection of an angle set defining an inverter output waveform in response to the power factor of the load and the normalized DC bus voltage so as to minimize the harmonic content of the inverter output waveform and to compensate for voltage drops occurring between the DC power supply and the load.

The inverter control system includes an angle set look-up table for storing a number of angle sets, a plurality of which define pulse width modulated waveforms and at least one of which defines a quasi-square wave. The control system selects an angle set defining a pulse width modulated waveform in response to the power factor angle and a normalized DC bus voltage having a value which is greater than or equal to one. The angle set defining the quasi-square wave is selected by the control system in response to the normalized DC bus voltage having a value which is less than one indicating transient conditions.

The control system is also responsive to the filter output current to detect fault conditions. In response to a detected fault condition, the control system selects at least one angle set defining a waveform to reduce the voltage at the load to zero while allowing the filter output current to increase to a given percentage of the rated current so as to enable actuation of the circuit breakers on the aircraft.

These and other objects and advantages of the invention, as well as details of an illustrative embodiment, will be more fully understood from the following description and the drawings.

BRIEF DESCRIPTION OF THE DRAWINGS

FIG. 3 is a graph illustrating the harmonic content change of two PWM inverter outputs as a function of the normalized DC bus voltage;

FIG. 4 is a graph illustrating a pulse width modulated waveform;

FIG. 5 is a graph illustrating the filter output voltage as a function of the filter output current;

BEST MODE FOR CARRYING OUT THE INVENTION

Figure 1:
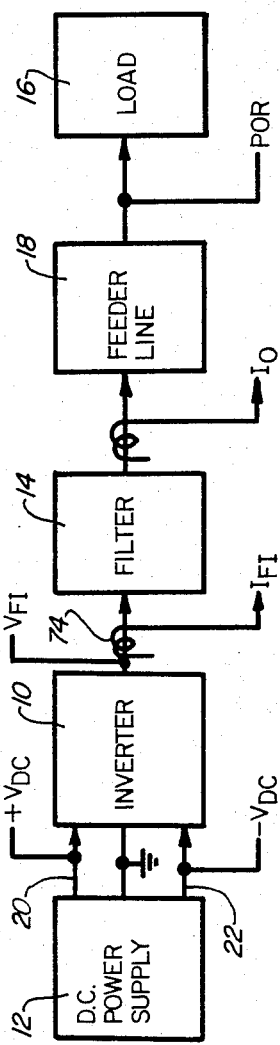
FIG. 1 is a block diagram of an inverter system for providing an AC output to a load.
Figure 2:
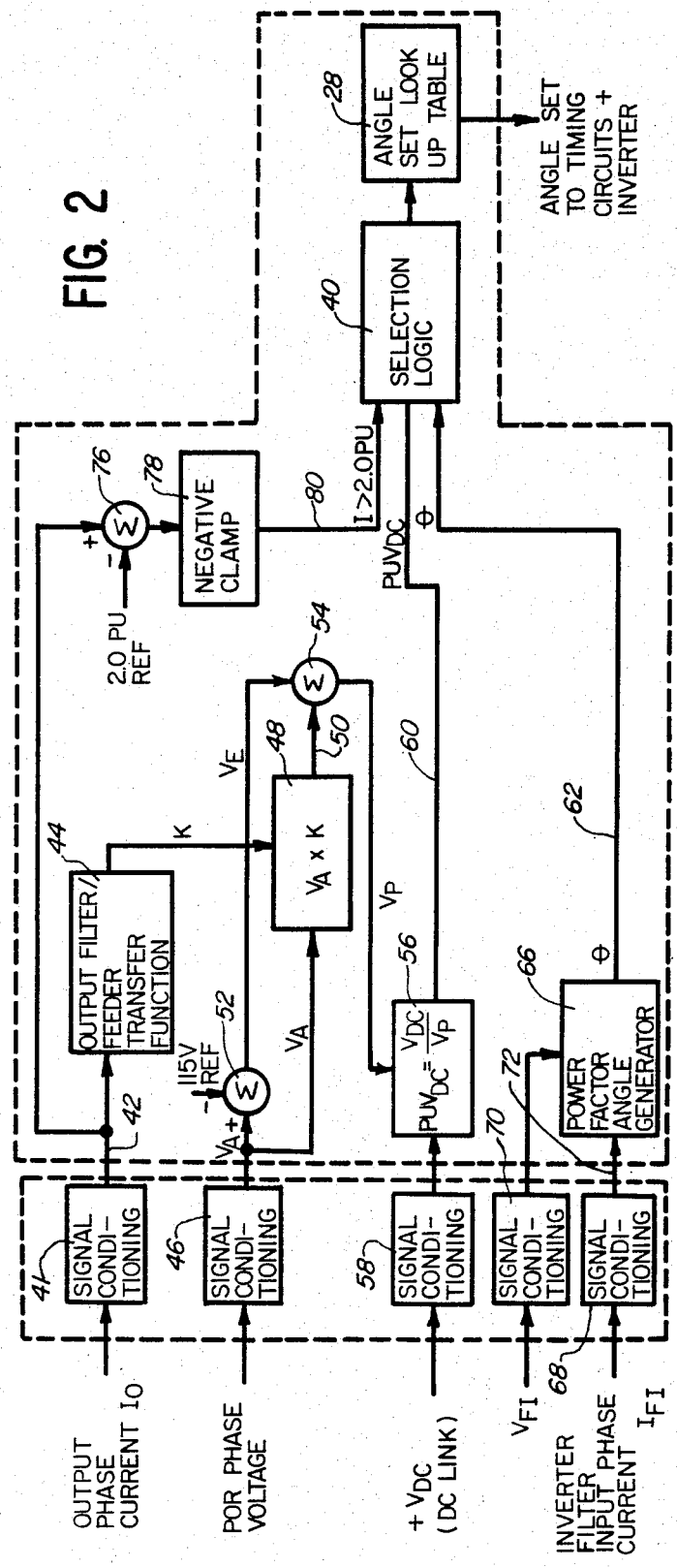
FIG. 2 is a block diagram of the inverter control system of the present invention.

An inverter 10 having a DC power supply 12 as shown in FIG. 1 is controlled by the system shown in FIG. 2 to provide a waveform to a filter 14 which, in response thereto, provides an AC output which is coupled to a load 16 by a feeder line 18. The inverter 10 is preferably a neutrally clamped pulse width modulated inverter which may be controlled to provide both pulse width modulated waveforms and quasi-square waves such as shown in the copending application Ser. No. 531,037 assigned to the assignee of the present invention. The neutrally clamped inverter includes a pair of inverter switches, such as transistors, which respectively connect the positive terminal 20 and the negative terminal 22 of the DC power supply 12 to the filter 14. The inverter also includes a bidirectional switch which connects the input of the filter 14 to ground. The switches are turned on and off at selected angles so as to provide a pulse width modulated waveform 24, such as shown in FIG. 4, to the filter 14 which, in response thereto, provides a sine wave output 26. The angles at which the inverter switches are turned on and off, ignoring a slight delay in the output, correspond respectively to the leading and trailing edges of the pulses forming the inverter output waveform and thus define the waveform to be provided by the inverter.

The inverter control system as shown in FIG. 2 includes an angle set look-up table 28 which stores a number of angle sets. The angle sets define the angles at which the inverter switches are to be turned on and off to control the inverter under various operating conditions to provide a waveform which has easily filtered harmonics and voltage regulation to compensate for voltage drops occurring between the DC power supply and the load. Angle sets defining pulse width modulated waveforms having easily filtered harmonics are those wherein the harmonics of the waveform up to 2N, where N is the number of pulses per half-cycle, are rendered nearly zero or minimized so that the first harmonic to be filtered is the 2N+1 harmonic. Because the first harmonic which must be filtered is the 2N+1 harmonic, the attenuation requirement of the filter 14 and the weight thereof may be reduced. It has been found that angle sets defining a waveform as shown in FIG. 4 having nine pulses per half-cycle so that N=9, provide an easily filtered waveform.

The various operating conditions for which angle sets are stored in the angle set look-up table 28 take into account power factor loads and voltage drops occurring between the DC power supply and the load. Power factor loads may introduce undesirable low order harmonics into the output waveform if not taken into account in the selection of an angle set to control the inverter switches. Further, the harmonic content of a pulse width modulated waveform is also affected by variations in the normalized DC bus voltage as illustrated in FIG. 3. FIG. 3 shows the changes in harmonic content of a 100% PWM inverter output waveform having a voltage swing of the rail-to-rail voltage, $+V_{DC}$ to $-V_{DC}$ and of a 50% PWM inverter output waveform having a voltage swing of one-half the rail-to-rail bus voltage, as a function of the normalized DC bus voltage $PUV_{DC}$. By taking into account the normalized DC bus voltage and the power factor of the load in selecting the angle set for controlling the inverter, the harmonic content of the inverter output waveform may be minimized so that the first harmonic to be filtered is the 2N+1 harmonic.

Figure 6:
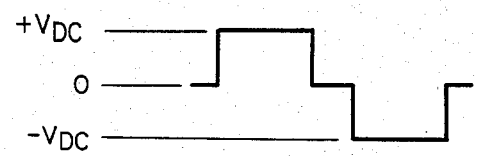
FIG. 6 is a graph illustrating a quasi-square wave.
Figure 7:
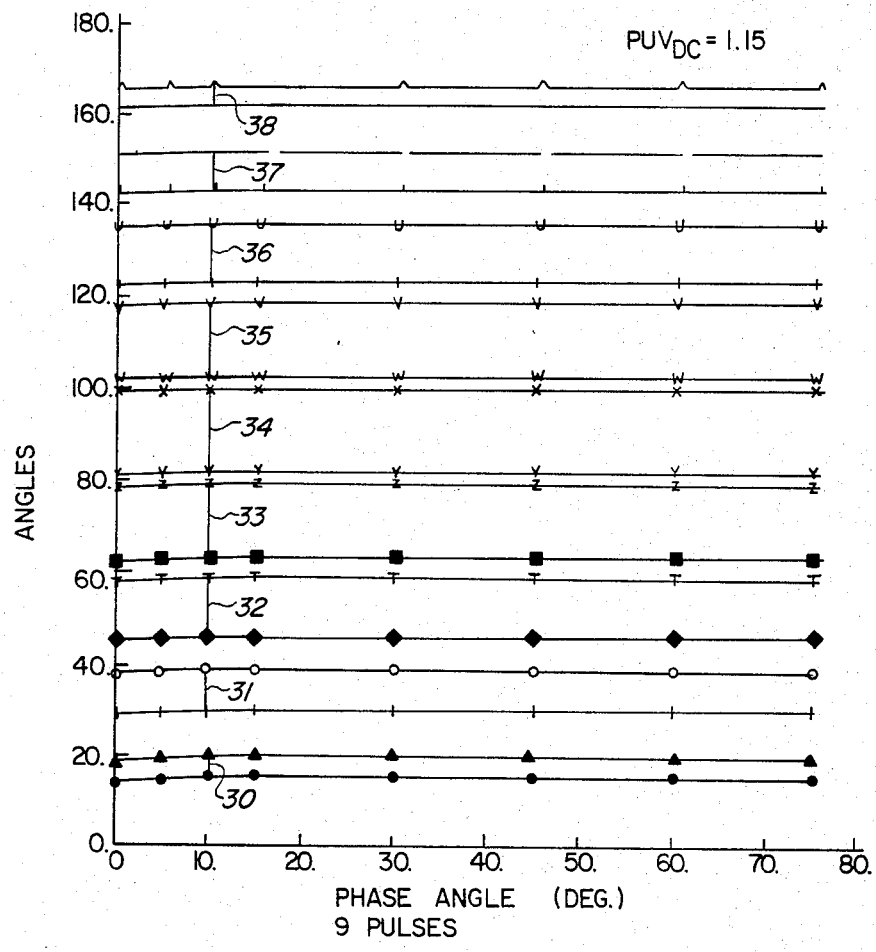
FIG. 7 is a graph illustrating various angle sets for a fixed normalized DC bus voltage and a variable power factor angle.
Figure 8:
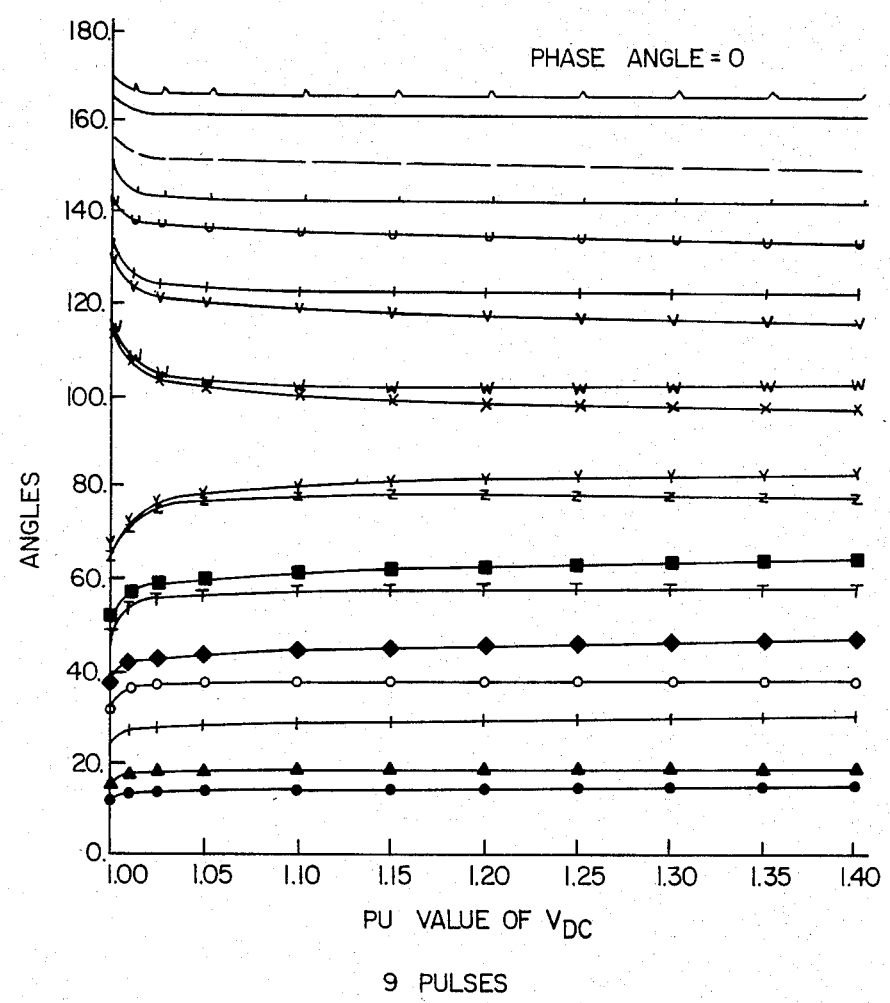
FIG. 8 is a graph illustrating various angle sets for a fixed power factor angle and variable normalized DC bus voltage.

The angle set look-up table 28 may be configured to store a number of subtables, each of which corresponds to a different fixed normalized DC bus voltage, $PUV_{DC}$, such as shown in FIG. 7 for $PUV_{DC} = 1.15$. For this configuration, each subtable stores a number of angle sets, each corresponding to a different power factor angle ranging from 0° to 75° and each defining a pulse width modulated waveform comprised, for example, of nine pulses 30-38 such as shown for a power factor angle of 10°. Alternatively, the angle set look-up table 28 may be configured to store subtables corresponding to different fixed power factor angles such as shown in FIG. 8 for a power factor angle of 0°. Each subtable for this configuration stores a number of angle sets, each corresponding to a different normalized DC bus voltage $PUV_{DC}$ ranging from 1.00 to 1.40. The subtables and angle sets, whether configured as shown in FIGS. 7 or 8, are addressed by a selection logic circuit 40 according to the normalized DC bus voltage and power factor angle. The angle set look-up table 28 also stores at least one angle set defining a quasi-square wave such as shown in FIG. 6, the quasi-square wave angle set being addressed by the selection logic circuit 40 under certain operating conditions as discussed below.

As shown in FIG. 2, the normalized DC bus voltage $PUV_{DC}$ is derived from the output phase current $I_O$, the point of regulation phase voltage, POR, and the positive DC bus voltage, $+V_{DC}$. The phase current $I_O$ is sensed at the output of the filter 14 by a current transformer or the like. The output phase current $I_O$ is applied to a signal conditioning circuit 41 which rectifies and filters the sensed phase current so as to provide a DC level output on a line 42 which is proportional to the current $I_O$. The signal on line 42 representing $I_O$ is applied to an output filter/feeder transfer function block 44. The output filter 14 and feeder line 18 are described by a transfer function which is a function of the filter output current $I_O$. The block 44 determines the value, K, of the filter feeder transfer function for the sensed filter output current $I_O$, the value K being used to scale the voltage sensed at the point of regulation in order to compensate for voltage drops occurring in the filter 14 and feeder line 18 as discussed below.

The point of regulation phase voltage, POR, is sensed at a point between the output of the feeder line 18 and the input to the load 16. The POR phase voltage is applied to a signal conditioning circuit 46 which is similar to the circuit 41 and provides an output, $V_A$, which is proportional to the POR phase voltage. The signal $V_A$ is applied to a block 48 which scales the signal by the value, K, of the filter/feeder transfer function to provide a product signal output on line 50 which provides a fundamental adjustment to compensate for voltage drops in the filter 14 and feeder line 18.

The signal $V_A$ is also applied to the positive input terminal of a summing junction 52, to the negative input terminal of which is applied a 115 volt reference signal which is the desired amplitude of the AC output to be applied to the load 16. The output of the summing junction 52 represents an error signal, $V_E$, which, when combined with the output of block 48 by a summing junction 54, provides a trim adjustment to compensate for voltage drops in the output due to variables such as temperature and the like. The output of the block 48 is applied to the positive input terminal of the summing junction 54 whereas the error signal $V_E$ is applied to the negative input terminal of the summing junction so that the trim adjustment for the error signal, $V_E$, is made in the opposite sense. The output of the summing junction 54 represents the voltage, $V_P$, required to obtain the desired peak amplitude of the sine wave output applied to the load 16.

The positive DC bus voltage $+V_{DC}$, is sensed at the terminal 20 and applied to a block 56 through a signal conditioning circuit 58. The block 56 determines the normalized DC bus voltage, $PUV_{DC}$ by dividing the positive DC bus voltage by the required voltage $V_P$. The normalized DC bus voltage output from the block 56 on a line 60 is applied to a selection logic circuit 40 which in response to the normalized DC bus voltage and a signal applied on line 62 representing the power factor angle, selects an angle set from the angle set look-up table 28 to control the inverter to provide an easily filtered waveform with voltage regulation for the conditions under which the inverter is operating.

The power factor angle represents the phase difference between the voltage $V_{FI}$ and current $I_{FI}$ at the input of the filter 14. The inverter filter input phase current $I_{FI}$ and phase voltage $V_{FI}$ are applied to a power factor angle generator 66 through respective signal and conditioning circuits 68 and 70. The signal conditioning circuit 68 includes a filter to provide a smooth sine wave output on a line 72 in response to the phase current sensed by a current transformer 74 at the input to the filter 14. The signal conditioning circuit 70 is responsive to the pulse width modulated waveform, $V_{FI}$, applied to the input of the filter to provide a sine wave output in phase therewith. The power factor angle generator 66 may include two zero crossover detectors which are respectively responsive to the phase current $I_{FI}$ and phase voltage $V_{FI}$ to determine the point at which each of the signals crosses zero. The power factor angle generator 66 also includes a phase detector which is responsive to the outputs of the zero crossover detectors to determine the phase difference between the voltage and current waveforms at the input to the filter 14. The phase difference representing the power factor angle is output on line 62 and applied to the selection logic circuit 40. It is noted that the signal conditioning circuit 70 and the zero crossover detector associated with the phase voltage $V_{FI}$ may be eliminated since the zero crossover point of the voltage waveform output from the inverter 10 is known from the angle set applied to the timing circuits which control the inverter switches.

The selection logic circuit 40, in selecting an angle set from the look-up table 28 to control the inverter under the operating conditions indicated by the normalized DC bus voltage on line 60 and the power factor angle on line 62, first determines whether the normalized DC bus voltage $PUV_{DC}$ is greater than or equal to one, a normalized DC bus voltage having a value less than one indicating transient conditions. If the normalized DC bus voltage $PUV_{DC}$ is greater than or equal to one, the selection logic 40 addresses the angle set look-up table 28 to select an angle set defining nine pulses per half-cycle of a pulse width modulated waveform, the angle set corresponding to the normalized DC bus voltage on line 60 and the power factor angle on line 62.

If there is a sharp increase in the load 16, transients can develop causing a significant drop in the voltage at the point of regulation. A significant drop in the POR voltage will cause the required voltage $V_P$ to increase to a value which is greater than the positive DC bus voltage so that the normalized DC bus voltage $PUV_{DC}$ is less than one. In response to a normalized DC bus voltage which is less than one, the selection logic circuit 40 addresses the look-up table 28 to select an angle set defining a quasi-square wave to provide voltage regulation while operating under transient conditions.

The inverter control system of FIG. 2 is also responsive to the filter output phase current, $I_O$, to determine whether fault conditions exist. If fault conditions are detected, the selection logic circuit 40 overrides the selection of an angle set in response to the normalized DC bus voltage and selects at least one angle set defining an inverter output waveform to reduce the voltage at the point of regulation to zero while allowing the filter output phase current $I_O$ to increase to a given percentage of the rated current required to actuate circuit breakers.

In order to determine whether fault conditions exist, the signal output on line 42 which is proportional to the phase current $I_O$ is applied to the positive input terminal of a summing junction 76, to the negative input terminal of which is applied a reference signal of 2.0 per unit, i.e., 200% of the rated current. If the phase current is greater than 200% of the rated current, the output of the summing junction is positive indicating fault conditions. The output of the summing junction 76 is applied to a negative clamp 78 which, in response to a positive input signal, provides a signal output on a line 80 which is proportional to the phase current greater than 200%. The selection logic circuit 40 responds to an output on line 80 indicating that the phase current is greater than 200% of the rated current by selecting successive angle sets defining pulse width modulated waveforms having a decreasing number of pulses. For example, the selection logic circuit 40 may select successive angle sets defining waveforms having seven pulses, five pulses and three pulses, after which an angle set is selected defining a quasi-square wave to enable the voltage at the point of regulation to be decreased to zero while allowing the current to increase, as shown in FIG. 5, to a level such as 300% of the rated current which level is required to actuate circuit breakers.

The inverter control system as shown in FIG. 2 provides selection of an angle set defining a pulse width modulated waveform in response to the power factor angle and the normalized DC bus voltage so as to minimize the harmonic content of the waveform and provide voltage regulation. The control system also provides for selection of an angle set defining a quasi-square wave to regulate the inverter output under transient and fault conditions.

I claim:

1. In a control system for an inverter having a power supply to provide a DC bus voltage, the inverter being controlled in accordance with an angle set to provide a waveform which is coupled to the input of a filter having an AC output applied to a load, an improved system for selecting an angle set defining a waveform to be provided by the inverter comprising:

means for normalizing said DC bus voltage;

means for determining the power factor angle of the input to the filter;

means for storing a plurality of angle sets defining pulse width modulated waveforms to be provided by the inverter; and means for selecting an angle set from said storage means in response to the normalized DC bus voltage and the power factor angle to minimize the harmonics of the inverter output waveform.

2. The control system of claim 1 wherein said storage means further stores an angle set defining a quasi-square wave.

3. The control system of claim 2 wherein said selecting means, in response to a normalized DC bus voltage indicating transient conditions, selects an angle set defining a quasi-square wave.

4. In a control system for an inverter having a power supply to provide a DC bus voltage, the inverter being controlled in accordance with an angle set to provide a waveform which is coupled to the input of a filter having an AC output applied to a load, the voltage at the load being regulated, an improved system for selecting an angle set defining a waveform to be provided by the inverter comprising:

means for sensing the current at the output of the filter to provide a signal proportional thereto;

means for comparing the filter output current signal to a reference signal representing a fault level to provide a fault signal when the filter output current signal is greater than or equal to said reference signal;

means for storing a plurality of angle sets defining waveforms to be provided by said inverter;

means responsive to a fault signal for selecting from said storage means at least one angle set defining a waveform to reduce the voltage at the load to zero while allowing the filter output current to increase to a given percentage of the rated current.

5. The control system of claim 4 wherein said reference signal represents 200% of the rated current.

6. The control system of claim 4 wherein said fault signal is proportional to the filter output current and said selecting means, in response to an increasing fault signal, selects a plurality of angle sets defining successive pulse width modulated waveforms having a decreasing number of pulses and then an angle set defining a quasi-square wave.

7. In a control system for an inverter having a power supply to provide a DC bus voltage, the inverter being controlled in accordance with an angle set to provide a waveform which is coupled to the input of a filter having an AC output applied to a load, the voltage at the load being regulated, an improved system for selecting an angle set to control the inverter comprising:
means for sensing the current at the output of the filter;
means for normalizing said DC bus voltage;
means for determining the power factor angle of the input to the filter;
means for storing a plurality of angle sets defining waveforms to be provided by said inverter; and
means for selecting an angle set from said storage means in response to said sensed current at the filter output, the normalized DC bus voltage and the power factor angle to control the inverter.

8. The control system of claim 7 wherein said storage means stores a plurality of angle sets, each defining a pulse width modulated waveform and an angle set defining a quasi-square wave, said selecting means being responsive to said power factor angle and to a normalized DC bus voltage having a value which is greater than or equal to one for selecting an angle set defining a pulse width modulated waveform.

9. The control system of claim 8 wherein said selecting means is responsive to a normalized DC bus voltage which is less than one for selecting an angle set defining a quasi-square wave.

10. The control system of claim 8 further including means for comparing the sensed filter output current signal to a reference signal representing a fault level to provide a fault when the filter output current signal is greater or equal to said reference signal, said selecting means including means responsive to a fault signal for overriding the selection of an angle set in response to the normalized DC bus voltage and power factor angle to select at least one angle set defining a waveform to reduce the voltage at the load to zero while allowing the filter output current to increase to a given percentage of the rated current.

11. In a control system for an inverter having a power supply to provide a DC bus voltage, the inverter being controlled in accordance with an angle set to provide a waveform coupled to the input of a filter having an AC output applied to a load at a point, the voltage at which is to be regulated, the improvement comprising:
means for sensing the current at the output of said filter to provide a signal proportional thereto;
means for sensing the voltage at said point of regulation to provide a signal proportional thereto;
means responsive to said filter output current signal and said point of regulation voltage signal for normalizing said DC bus voltage;
means for determining the power factor angle of the input to the filter;
means for storing a plurality of angle sets defining waveforms to be provided by said inverter; and
means for selecting an angle set from said storage means in response to said normalized DC bus voltage and power factor angle to minimize the harmonics of said waveform and to compensate for voltage drops occurring between the DC power supply and the point of regulation.

12. The control system of claim 11 wherein the filter output is coupled to the load through a feeder, said filter and feeder having a transfer function which is a function of the filter output current, said normalizing means including:
means for determining the value of said filterfeeder transfer function for the sensed filter output current; and
means for scaling the point of regulation voltage signal by said value to provide a signal representing the voltage required to obtain a desired peak amplitude of the AC output, compensating for voltage drops occurring in the filter and feeder.

13. The control system of claim 12 wherein said normalizing means further includes:
means for providing an error signal representing the difference between the point of regulation voltage signal and a reference signal representing the desired peak amplitude of the AC output; and
means for combining said error signal with said signal provided by said scaling means to provide a signal representing the voltage required to obtain a desired peak amplitude of the AC output compensating for voltage drops occurring between the DC power supply and the point of regulation.

14. The control system of claim 13 further including:
means for sensing a bus voltage from the DC power supply to provide a signal proportional thereto; and
means for dividing the DC bus voltage signal by the required voltage signal to provide a signal representing the normalized DC bus voltage.

15. The control system of claim 14 wherein said storage means stores a plurality of angle sets, each defining a pulse width modulated waveform and an angle set defining a quasi-square wave, said selecting means being responsive to said power factor angle and to a normalized DC bus voltage having a value which is greater than or equal to one for selecting an angle set defining a pulse width modulated waveform.

16. The control system of claim 15 wherein said selecting means is responsive to a normalized DC bus voltage which is less than one for selecting an angle set defining a quasi-square wave.

* * * * *